(12) United States Patent
Johnson et al.

(10) Patent No.: US 10,746,176 B2
(45) Date of Patent: Aug. 18, 2020

(54) COMPRESSOR CONTROL FOR INCREASED EFFICIENCY

(71) Applicant: TRANE INTERNATIONAL INC., Davidson, NC (US)

(72) Inventors: Jay H. Johnson, Houston, MN (US); Alberto Scala, Onalaska, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 189 days.

(21) Appl. No.: 15/620,516

(22) Filed: Jun. 12, 2017

(65) Prior Publication Data

US 2018/0356139 A1   Dec. 13, 2018

(51) Int. Cl.
| | | |
|---|---|---|
| *F04C 28/08* | (2006.01) | |
| *F04C 28/12* | (2006.01) | |
| *F04B 49/20* | (2006.01) | |
| *F04B 49/03* | (2006.01) | |
| *F04B 49/06* | (2006.01) | |

(Continued)

(52) U.S. Cl.
CPC .............. *F04C 28/08* (2013.01); *F04B 49/03* (2013.01); *F04B 49/065* (2013.01); *F04B 49/20* (2013.01); *F04C 18/16* (2013.01); *F04C 28/12* (2013.01); *F04C 28/24* (2013.01); *F04C 28/28* (2013.01); *F25B 49/022* (2013.01); *F04C 2270/015* (2013.01); *F04C 2270/051* (2013.01); *F04C 2270/42* (2013.01); *F04C 2270/44* (2013.01); *F25B 2400/0401* (2013.01); *F25B 2600/025* (2013.01); *F25B 2600/0253* (2013.01);

(Continued)

(58) Field of Classification Search
CPC .... F04B 27/24; F04C 18/08; F04C 2240/809; F04C 2270/015; F04C 2270/051; F04C 2270/205; F04C 2270/42; F04C 2270/44
See application file for complete search history.

(56) References Cited

U.S. PATENT DOCUMENTS

| 4,025,244 A * | 5/1977 | Sato ...................... F04C 28/125 418/87 |
|---|---|---|
| 2007/0240436 A1* | 10/2007 | Landers ................ F25B 49/022 62/157 |

(Continued)

FOREIGN PATENT DOCUMENTS

| EP | 1158167 | 11/2001 |
|---|---|---|
| WO | 2009/091400 | 7/2009 |

OTHER PUBLICATIONS

Extended European Search Report, European Patent Application No. 181773425, dated Nov. 7, 2018 (8 pages).

*Primary Examiner* — Bryan M Lettman
*Assistant Examiner* — Timothy P Solak
(74) *Attorney, Agent, or Firm* — Harme, Schumann, Mueller & Larson, P.C.

(57) ABSTRACT

Control systems and methods for increasing efficiency of a compressor while the compressor capacity exceeds compressor load, by using a mechanical unloader such as a slide valve to reduce the internal volume ratio of the compressor and allow a more efficient speed to be maintained by a variable frequency drive (VFD) while reducing the compressor capacity based on the load. Control systems include the VFD, a controller for the VFD and the mechanical unloader, and temperature sensors. Compressor embodiments further include one or more compressors and mechanical unloaders operated by the control systems.

23 Claims, 4 Drawing Sheets

(51) Int. Cl.
*F25B 49/02* (2006.01)
*F04C 18/16* (2006.01)
*F04C 28/24* (2006.01)
*F04C 28/28* (2006.01)

(52) U.S. Cl.
CPC ............... *F25B 2600/0262* (2013.01); *F25B 2700/21151* (2013.01); *F25B 2700/21152* (2013.01)

(56) References Cited

U.S. PATENT DOCUMENTS

| | | | | |
|---|---|---|---|---|
| 2008/0314057 | A1* | 12/2008 | Lifson | B60H 1/3216 62/228.4 |
| 2010/0263391 | A1* | 10/2010 | Tetu | F04D 27/0253 62/89 |
| 2015/0093273 | A1* | 4/2015 | Johnson | F04C 28/08 418/1 |
| 2015/0292762 | A1* | 10/2015 | Clanin | F25B 49/02 700/276 |

* cited by examiner

COMPRESSOR CONTROL FOR INCREASED EFFICIENCY

FIELD

A control system and method for efficiently utilizing mechanical unloading of a compressor in combination with a variable frequency drive controlling a variable speed motor in the compressor.

BACKGROUND

Mechanical unloaders and variable frequency drives (VFDs) are alternative means of reducing compressor capacity to correspond to loads below the maximum compressor capacity. Reducing compressor capacity when load is below the maximum compressor capacity allows the compressor to save some energy. VFDs allow compressor capacity to be reduced by reducing compressor speed when capacity exceeds load. Mechanical unloaders reduce compressor capacity by affecting the volume ratio of the compressor. VFDs and mechanical unloaders are typically applied separately, using only one or the other in a compressor design, or when both are features of a compressor, they are used sequentially, reducing compressor speed to a minimum level via the VFD before mechanically unloading the compressor.

For example, when a compressor is to be operated at 90% capacity, a VFD may reduce its speed from 60 Hz to 54 Hz. Mechanical unloaders may only be used once a minimum speed threshold for compressor operations, for example 30 Hz, has been met through the VFD, and only then will mechanical unloaders be used to adjust the volume ratio of the compressor to further reduce capacity from 50% of capacity on down to the minimum capacity of the compressor.

SUMMARY

Control systems and methods for controlling both variable frequency drives and mechanical unloaders together to improve compressor efficiency by selecting a frequency at which to drive a compressor and adjusting mechanical unloader positions when capacity is greater than load. This improves efficiency for compressor operation by selecting efficient combinations of compressor speed and mechanical unloading when adjusting compressor capacity. The efficient compressor speed is selected using the current operational parameters of the compressor, such as the suction and discharge temperatures. Using mechanical unloaders and variable frequency drives together also reduces overcompression. Using compressors and mechanical unloaders together, as opposed to individually, offers energy efficiency improvements of at or about 5% or more than 5% during ordinary operations over compressors that use only mechanical unloading, that use only speed control to reduce capacity, or that reduce capacity first through speed control and only then through mechanical unloading.

In a compressor embodiment, there is a compressor that includes one or more mechanical unloaders, with compressor speed controlled by a variable frequency drive (VFD). The VFD and one or more mechanical unloaders are connected to a controller, which also receives operational parameter data from at least one sensor. The controller includes a memory that stores one or more maps of compressor efficiency by compressor speed and mechanical unloading, and a processor that receives operational parameter data, retrieves a map of compressor efficiency by speed and mechanical loading based on the operational parameter data, determines a compressor speed based on the map of compressor efficiency, and compares compressor capacity and load and directs the operation of a mechanical unloader when capacity exceeds load.

In an embodiment, the operational parameter data may include temperature data from a first temperature sensor that measures a suction temperature and a second temperature sensor that measures a discharge temperature.

In an embodiment, the compressor may be a screw compressor.

In an embodiment, the one or more mechanical unloaders may be slide valves or lifting valves.

In an embodiment, the first temperature sensor is located at an inlet of the compressor.

In an embodiment, the second temperature sensor is located at an outlet of the compressor.

In an embodiment, the processor may determine whether compressor capacity exceeds load by comparing the discharge temperature to a set point temperature.

A method embodiment includes receiving operational parameters, retrieving a map of compressor efficiency based on the operational parameters, selecting a compressor speed based on the map of compressor efficiency, driving the compressor at the selected speed via a VFD, determining whether compressor capacity exceeds load, and if compressor capacity exceeds load, increasing the extent to which one or more mechanical unloaders reduce the capacity of the compressor.

In an embodiment, the operational parameters are a suction temperature and a discharge temperature.

In an embodiment, the operational parameters may further include a flow rate for the compressor.

In an embodiment, the method may include receiving a current compressor speed and determining the flow rate for the compressor.

In an embodiment of the method, determining whether compressor capacity exceeds load may be a comparison of the discharge temperature to a set point temperature.

In an embodiment, if compressor capacity is exceeded by compressor load, mechanical unloaders may be operated to minimize their reduction of the capacity of the compressor, and compressor speed may be increased.

In a control system embodiment, sensors measuring operational parameters, for example a first temperature sensor measures a suction temperature of a compressor and a second temperature sensor measures a discharge temperature of the compressor. The sensors are connected to a controller, which includes a memory storing one or more maps of compressor efficiency by compressor speed and mechanical unloading, and a processor that receives operational parameter data from, for example, the temperature sensors, retrieves a map of compressor efficiency by speed and mechanical loading, determines a compressor speed based on the map of compressor efficiency, and compares compressor capacity and load and directs the operation of a mechanical unloader when capacity exceeds load. The controller is connected to a VFD which operates the compressor at the speed determined by the processor and to an actuator for one or more mechanical unloaders.

In an embodiment, the processor may determine a flow rate based on compressor speed data received from the VFD.

In an embodiment, the processor may determine whether compressor capacity exceeds load by comparing the discharge temperature to a set point temperature.

In an embodiment, the mechanical unloader may be a slide valve.

In an embodiment, the mechanical unloader may be a lifting valve.

DRAWINGS

DETAILED DESCRIPTION

In systems such as HVACR systems, compressors may not be required to operate at 100% of their capacity at all times. Where the load on the compressor is less than the capacity, methods of reducing compressor capacity can provide energy savings. For example, compressor efficiency can be increased by using a variable frequency drive (VFD) together with mechanical unloaders to reduce compressor capacity when the compressor load is less than the capacity. This improvement in efficiency may be approximately 5% to 7%. This control requires both a VFD and mechanical unloaders to be included in a compressor. This control may be accomplished by using a controller with embedded logic to identify a compressor speed at which improved efficiency can be realized and then automatically and continuously adjusting mechanical unloaders to further reduce capacity at the selected speed.

Figure 1:
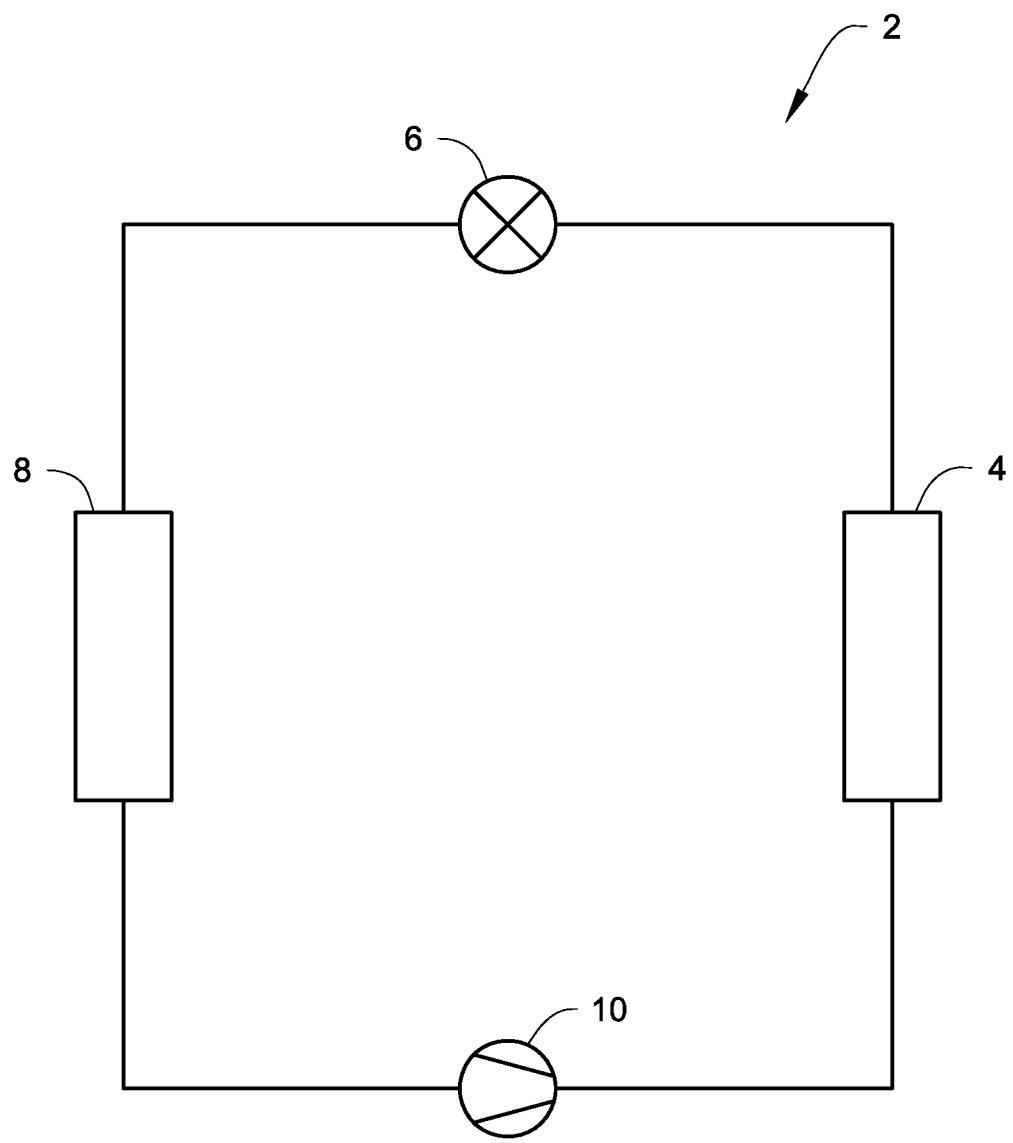
FIG. 1 is a schematic diagram showing a refrigerant circuit.

FIG. 1 is a schematic diagram of a refrigerant circuit 2, according to an embodiment. The refrigerant circuit 2 generally includes a compressor 10, a condenser 4, an expansion device 6, and an evaporator 8. The compressor 10 can be a positive displacement compressor, for example, a scroll compressor, a screw compressor, or a rotary vane compressor. The refrigerant circuit 2 is an example and can be modified to include additional components. For example, in an embodiment, the refrigerant circuit 2 can include other components such as, but not limited to, an economizer heat exchanger, one or more flow control devices, a receiver tank, a dryer, a suction-liquid heat exchanger, or the like.

The refrigerant circuit 2 can generally be applied in a variety of systems used to control an environmental condition (e.g., temperature, humidity, air quality, or the like) in a space (generally referred to as a conditioned space). Examples of such systems include, but are not limited to, HVACR systems, transport refrigeration systems, or the like.

The compressor 10, condenser 4, expansion device 6, and evaporator 8 are fluidly connected. The refrigerant circuit 2 can operate according to generally known principles. The refrigerant circuit 2 can be configured to heat or cool a liquid process fluid (e.g., a heat transfer fluid or medium such as, but not limited to, water, glycol, or the like), in which case the refrigerant circuit 2 may be generally representative of a liquid chiller system. The refrigerant circuit 2 can alternatively be configured to heat or cool a gaseous process fluid (e.g., a heat transfer medium or fluid such as, but not limited to, air or the like), in which case the refrigerant circuit 2 may be generally representative of an air conditioner or heat pump.

In operation, the compressor 10 compresses a working fluid (e.g., a heat transfer fluid such as a refrigerant or the like) from a relatively lower pressure gas to a relatively higher-pressure gas. The relatively higher-pressure gas is also at a relatively higher temperature, which is discharged from the compressor 10 and flows through the condenser 4. The working fluid flows through the condenser 4 and rejects heat to a process fluid (e.g., air or the like), thereby cooling the working fluid. The cooled working fluid, which is now in a liquid form, flows to the expansion device 6. In an embodiment in which the condenser 4 includes a subcooler portion, the liquid working fluid can flow through the subcooler portion prior to flowing to the expansion device 6. In the subcooler portion, the working fluid may be further subcooled. The expansion device 6 reduces the pressure of the working fluid. As a result, a portion of the working fluid is converted to a gaseous form. The working fluid, which is now in a mixed liquid and gaseous form flows to the evaporator 8. The working fluid flows through the evaporator 8 and absorbs heat from a process fluid (e.g., water, glycol, air, or the like) heating the working fluid, and converting it to a gaseous form. The gaseous working fluid then returns to the compressor 10. The above-described process continues while the refrigerant circuit is operating, for example, in a cooling mode (e.g., while the compressor 10 is enabled).

Figure 2:
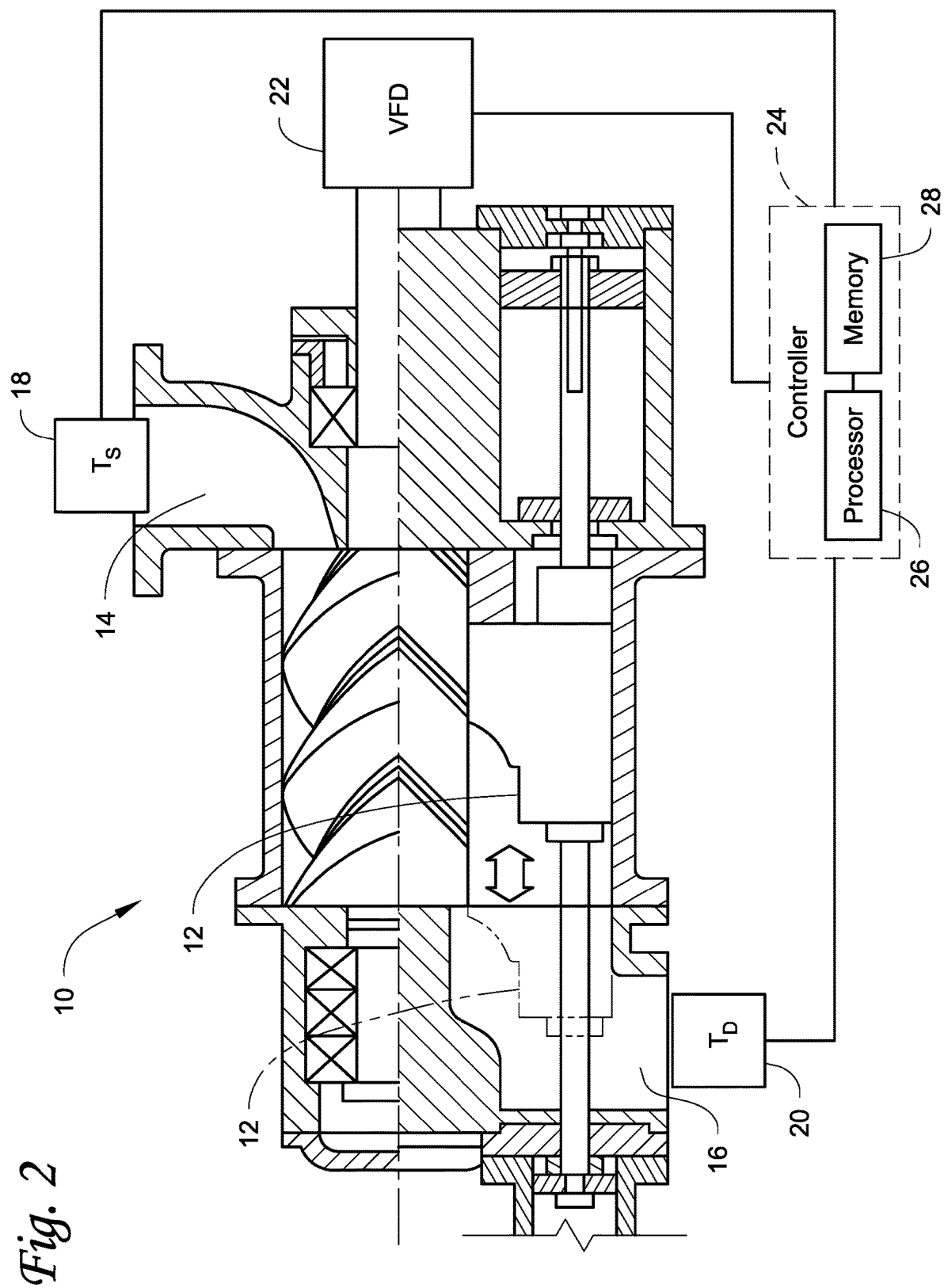
FIG. 2 is a diagram of a compressor embodiment.

FIG. 2 depicts a compressor embodiment which may be used in the refrigerant circuit of FIG. 1. The compressor embodiment of FIG. 2 may be used, for example, in an HVACR system such as a chiller. The compressor embodiment shown in FIG. 2 includes a compressor 10, which has mechanical unloaders 12, sensors measuring operational parameters, such as temperature sensor 18 at the inlet 14 and temperature sensor 20 at the outlet 16 of the compressor 10, and where the compressor 10 is connected to a variable frequency drive (VFD) 22. The VFD 22 and the temperature sensors 18 and 20 are connected to a controller 24, which includes a memory 28 and a processor 26, and the controller 24 is connected to an actuator or a control system for the mechanical unloaders 12.

Compressor 10 is a positive displacement compressor such as a screw compressor, a scroll compressor or a rotary vane compressor. The speed at which the compressor 10 operates is controlled by VFD 22, and the compressor 10 features one or more mechanical unloaders 12, for example a slide valve, a lifting valve or a piston-actuated unloader. The capacity of the compressor may be defined based on the maximum change in temperature the compressor can provide to a particular flow rate of fluid through the compressor, or a design value based on the possible change in temperature and a flow rate. A current load for the compressor may be determined from the speed at which the compressor is operating in terms of flow, such as a measure of volumetric flow such as cubic feet per minute, and the change in temperature of the fluid traveling through the compressor. The load of the compressor 10 may, in some instances, be measured as a percentage of a design capacity for that compressor, for example a 100% load equaling the full design capacity for that compressor, and a 50% load equaling half of the design capacity for that compressor.

Mechanical unloaders 12 may be, for example, slide valves, lifting valves, piston-actuated unloaders such as a piston operating a series of windows on the compressor, or other mechanisms for altering the volume ratio of a compressor 10, for example by opening or closing a slide valve. One or more mechanical unloaders 12 may be included in the compressor 10. In embodiments with one mechanical unloader 12, the effect of the mechanical unloader 12 on volume ratio for the compressor may vary discretely or continuously. In embodiments with multiple mechanical unloaders 12, each mechanical unloader 12 may vary discretely, continuously, or in a binary fashion. When there are multiple mechanical unloaders 12 each operating in a binary fashion, combinations of individual unloaders may be used to discretely vary the overall effect of the multiple mechanical unloaders on the compressor. The position of the mechanical unloaders may be described as a percentage, with 100% indicating that the mechanical unloaders are not reducing the capacity of the compressor, and 0% indicating that the mechanical unloaders are providing their maximum potential reduction of capacity to the compressor. For example, a single unloader such as a slide valve could vary continuously from 100% to 0%. In another example, a piston operating a plurality of windows could vary discretely, with levels of 100%, 66%, 33% and 0%. In another example, one mechanical unloader 12 of a plurality of mechanical unloaders 12 on a compressor 10 may vary only between 100% and 0% with no intermediary levels of effect on compressor capacity for that individual mechanical unloader. In an embodiment, a mechanical unloader position sensor or an actuator controlling the mechanical unloader 12 may report to the controller 24 the position of the mechanical unloader 12 and the extent the unloader reduces the capacity of compressor 10.

A variable frequency drive (VFD) 22 controls the speed of the compressor, for example by controlling the frequency at which the compressor 10 is operating, such as the frequency with which the screws rotate in a screw compressor. The VFD 22 is connected to a controller 24, which sets the frequency at which the VFD 22 operates the compressor 10.

One or more sensors measure the operational parameters of the system which includes the compressor embodiment shown in FIG. 2, such as a chiller in an HVACR system. The operational parameters may be, for example, a plurality of temperature measurements such as a suction temperature and a discharge temperature for the compressor 10. Other examples of operational parameters may include a suction pressure of the compressor 10, a discharge pressure of the compressor 10, a temperature for a process fluid leaving the evaporator of a refrigerant circuit, and/or the frequency of operation of a motor of compressor 10, for example provided by the VFD 22.

In an embodiment such as the example shown in FIG. 2, the sensors measuring operational parameters may be temperature sensors 18 and 20. Temperature sensors 18 and 20 are located near the inlet 14 and outlet 16 of the compressor 10, respectively, measuring the suction temperature near the inlet 14 to the compressor 10 and the discharge temperature near the outlet 16 of the compressor 10 as the compressor 10 operates.

The VFD 22 and the mechanical unloader 12 are connected to a controller 24. The controller 24 is connected to temperature sensors 18 and 20 and receives temperature data corresponding to the suction temperature and the discharge temperature of the compressor 10. The controller 24 includes a memory storing a map associating compressor energy efficiency with a compressor speed and extent of mechanical unloading based on operational parameters such as the volume of fluid handled by the compressor 10, suction temperature, and discharge temperature. The controller 24 may also receive data from the compressor 10 regarding current compressor speed from the VFD 22, from which the controller 24 may determine the volume of fluid currently handled by the compressor 10.

Figure 3:
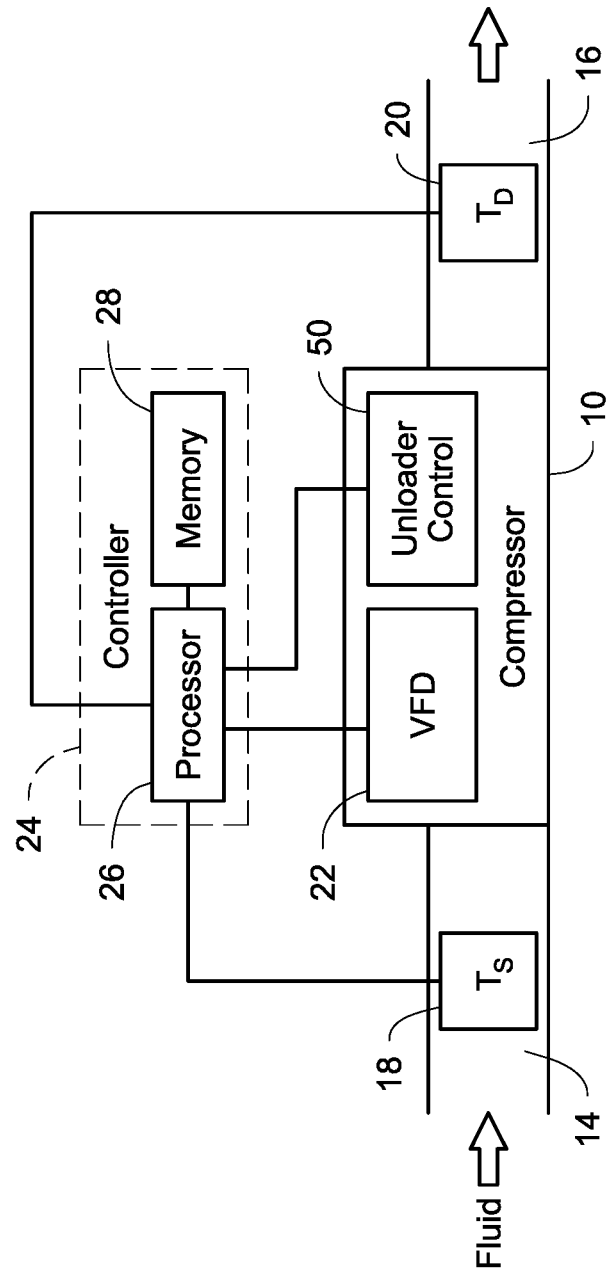
FIG. 3 is a system diagram of a control system embodiment.

FIG. 3 is a system diagram for a control system embodiment, showing an embodiment that is applied to the compressor of FIG. 2. Temperature sensors 18 and 20 provide temperature data to the controller 24. Controller 24 may also receive compressor data from VFD 22 which drives the compressor 10. Controller 24 determines a speed for the compressor 10 and provides it to the VFD 22, and iteratively instructs the mechanical unloader control 50 to operate one or more mechanical unloaders 12 to effect compressor capacity.

Temperature sensors 18 and 20 are located at the inlet 14 and outlet 16 of a compressor. The temperature sensor 18 located at the inlet 14 of the compressor measures a suction temperature, and the temperature sensor 20 located at the outlet 16 of the compressor measures a discharge temperature.

Controller 24 includes processor 26 and memory 28. The controller 24 is connected to sensors measuring operational parameters, for example temperature sensors 18 and 20, a variable frequency drive (VFD) 22 controlling the speed of the compressor 10, and at least one unloader control 50 for a mechanical unloader 12 of the compressor 10. The controller 24 receives operational parameter data, directs the speed of operation of the compressor 10 through the VFD 22, and controls the extent to which the mechanical unloader 12 reduces the capacity of the compressor 10 through the unloader control 50. The controller 24 and, if not already present in an existing compressor, the temperature sensors 18 and 20, and the unloader control 50 may be added to the existing compressor if the existing compressor includes both mechanical unloaders 12 and a VFD 22 controlling the speed of the compressor.

Processor 26 receives operational parameter data such as temperature data from the temperature sensors 18 and 20 or the memory 28, and receives a current compressor speed from the VFD 22 or the memory 28. The processor may compute a flow rate from the received data, or receive flow rate data directly, for example from the compressor. The processor 26 requests from the memory 28 a map of compressor efficiency based on compressor speed and mechanical unloading of the compressor 10 which corresponds to the received temperature values and the current flow rate. The processor 26 receives the map from the memory and interrogates the map to determine if a combination of compressor speed and mechanical unloading provides an improved efficiency according to the map. If a combination of compressor speed and mechanical unloading offers an improvement in efficiency, the compressor speed of that combination is provided to the VFD 22. Where there is no compressor speed offering superior efficiency, the current compressor speed may be maintained.

Memory 28 is configured to store maps which correlate compressor speed and unloader position to efficiency under particular load conditions. Memory 28 may be, for example, flash memory, a hard disk drive, or other storage which can store the maps, and which may be accessed by the processor 26 to retrieve the maps. The maps may be determined based on simulation or testing of a compressor design, and may be specific to a particular compressor design. The memory 28 may be loaded with particular maps for the design of the compressor 10 with which it is used with in a system. The memory 28 may also, in an embodiment, receive and store additional data for use by the processor 26, for example the current desired speed for the compressor 10, temperature data received from the temperature sensors 18 and 20, or the status of one or more mechanical unloaders 12 of the compressor 10.

Variable frequency drive (VFD) 22 is connected to controller 24 and receives from controller 24 the speed at which to operate compressor 10. VFD 22 drives the compressor 10 at the selected speed. The range of speeds may be a bounded range, for example having a minimum of 30 Hz and a maximum of 60 Hz with that range determined for a particular compressor design and the range programmed into the memory 28 of the controller 24 or the VFD 22. In an embodiment, the range of frequencies may be 30-70 Hz. In an embodiment, the range of frequencies may be 15-65 Hz.

Unloader control 50 is connected to controller 24 and receives instructions for changing the extent to which the mechanical unloaders 12 affect the capacity of the compressor 10. The unloader control 50 drives one or more actuators which control the position of the one or more mechanical unloaders 12. In an embodiment, actuators or controllers for a mechanical unloader 12 may provide feedback regarding the status of the mechanical unloader 12 to the controller 24, such as the position of the unloader or other indicators of the extent to which the unloader is reducing the capacity of the compressor 10.

Figure 4:
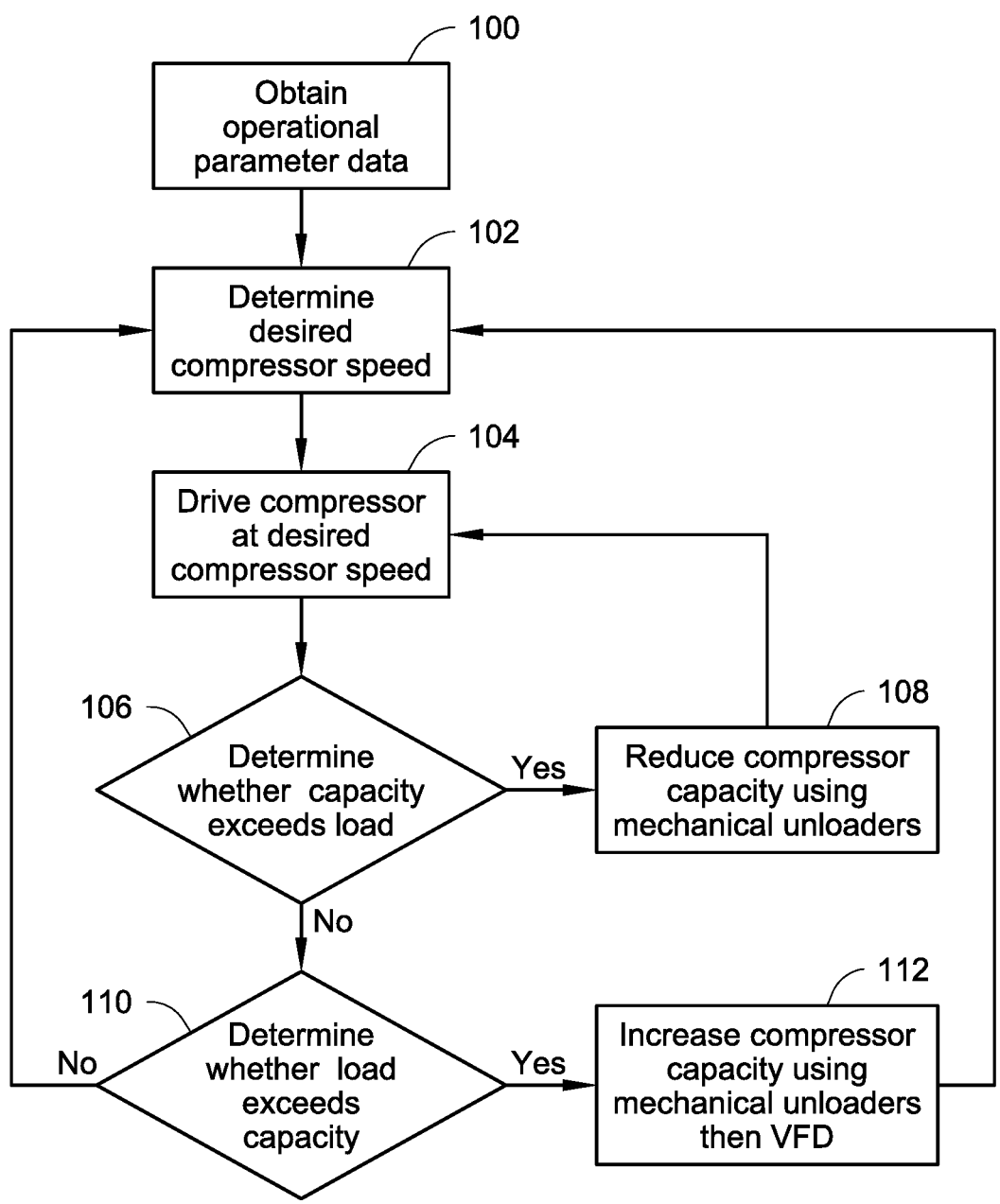
FIG. 4 is a process flowchart for a method embodiment.

FIG. 4 is a flowchart of a method embodiment. Operational parameter data is obtained in step 100. The operational parameter data may include discharge temperature data, suction temperature data, and flow rate through the compressor. The operational parameter data is used to determine a desired speed for the compressor in step 102. In step 104, the VFD 22 drives the compressor at the desired speed. When the compressor is operating at the desired speed, it is determined whether the current capacity exceeds the current load in step 106. When the capacity is determined to exceed the compressor load, the mechanical unloaders 12 may be used to reduce the capacity of the compressor 10 in step 108. The reduction of capacity in step 108 may be incremental, and steps 106 and 108 may be iterated so long as capacity continues to exceed load.

Operational parameter data is obtained in step 100. The operational parameter data may include, for example, discharge temperature data, suction temperature data, and flow rate through the compressor. When the operational parameter is temperature data, the data may be received from two or more temperature sensors, for example providing at least a suction temperature and a discharge temperature for the compressor. When the method of this embodiment is applied in the compressor shown in FIG. 2, suction temperature may be measured by a temperature sensor 18 located at the inlet 14 to the compressor, and the discharge temperature may be measured by a temperature sensor 20 located at an outlet 16 from the compressor 10. Flow rate data may be received directly by the controller 24 from the compressor 10, or flow rate data may be computed by the processor based on inputs such as the speed at which the compressor 10 is operating or the suction at the inlet 14 of the compressor 10. In an embodiment, the flow rate is computed using the suction temperature and suction pressure measured by sensors at the inlet 14 of the compressor 10 and the drive frequency of the compressor 10 provided by the VFD 22. The information obtained in this step may be provided directly to the processor 26 or may be stored in a memory 28 for provision to the processor.

A desired speed is determined in step 102. The processor receives the temperature data for the suction temperature and the discharge temperature and the flow rate data obtained in step 100 and receives from the memory a map of compressor efficiency by compressor speed and, in an embodiment, mechanical unloading for the current temperature and flow rate conditions. The map may be predetermined for a compressor 10 based on the design of that compressor and computational modeling or physical testing of the compressor design under the range of operating temperature and flow rate conditions, and the predetermined map stored in a memory 28. This testing may be, for example, running a compressor design across the full range of permissible compressor speeds, for example, 30-60 Hz, and unloader positions, for example, 100% to 0%, while measuring energy consumption, and running this test for each of a set of suction temperature, discharge temperature and flow rate conditions. The map is referenced to find a compressor speed having a higher efficiency, for example by having a lower energy consumption under the current temperature and flow rate conditions. When the map is referenced to find a compressor speed, this may be done without respect to the mechanical unloading component of the map, for example by determining the maximum efficiency value for each compressor speed across all mechanical unloading levels and comparing those maximum efficiency values to determine the compressor speed with the highest potential efficiency. The compressor speed selected in this step 102 is set as the desired speed for the VFD 22 controlling the compressor 10.

Once the desired speed has been determined in step 102, the desired speed is communicated to the VFD 22 controlling the compressor 10 and the compressor 10 is operated at the desired speed in step 104. The desired speed may be expressed as a frequency at which the compressor 10 is to be operated, for example, when a motor of a compressor is an asynchronous motor. The VFD 22 receives the desired speed and drives the compressor 10 at the desired speed.

While the VFD 22 operates the compressor 10 at the desired speed 104, one or more mechanical unloaders 12 may be used to adjust the capacity of the compressor to such that the capacity is closer to the load on the compressor. The compressor capacity is compared to the compressor load in step 106. Current compressor capacity compared to load may be determined from operational parameter data such as the temperature of a process fluid leaving the evaporator of a refrigerant circuit which includes the compressor 10, and a set point temperature for the refrigerant circuit. Where capacity exceeds load, the temperature of a process fluid leaving the evaporator of a refrigerant circuit may be less than a set output temperature of the refrigerant circuit. Where load exceeds capacity, the temperature of a process fluid leaving the evaporator of a refrigerant circuit may be higher than the set output temperature of the refrigerant circuit.

When the capacity is determined to exceed the load while the VFD 22 operates the compressor 10 at the desired speed during step 106, the mechanical unloaders are operated to reduce the capacity of the compressor 10 is increased in step 108. For compressors where the one or more mechanical unloaders have discrete settings, the mechanical unloaders may be incremented, for example by the smallest discrete step. Following step 108, the method returns to step 106 comparing compressor capacity and compressor load in the new condition where the mechanical unloader 12 has been incremented, and iterates step 106 and step 108 until capacity and load are within an acceptable deviation from one another. In an embodiment, the acceptable deviation is 0.25% of maximum load.

In the event that the comparison of capacity and load in step 106 shows that load exceeds capacity, for example by finding that the discharge temperature exceeds a set point temperature, capacity may be increased to meet load in step 112. Capacity may be increased first by operating the mechanical unloaders 12 to minimize their reduction of compressor capacity, for example setting them to their 100% position. The balance of capacity and load may be determined again once the mechanical unloaders have been used to increase capacity. If load still exceeds capacity following the operation of mechanical unloaders 12, then the VFD 22 will be used to increase the speed of the compressor 10 until capacity exceeds load once more. Once capacity exceeds load, the system may return to step 102 where a desired speed is calculated from the suction temperature, the discharge temperature and the flow rate through the compressor 10.

Once the mechanical unloader position has been found for a desired frequency and compressor load, the flow rate, suction temperature and discharge temperature may be monitored in step 106 to ensure that capacity and load remain within an acceptable deviation from one another. During step 106, operation of the compressor at the desired speed and the corresponding mechanical unloader position improves efficiency compared to a compressor that uses just a VFD or just mechanical unloaders to reduce capacity.

In some instances, for example where there is a change in compressor load, the load may exceed capacity. Capacity exceeding load may be determined, for example, by discharge temperature exceeding a desired set point. This may be determined during the monitoring step 106 when the compressor 10 is operated at the desired speed and mechanical unloader position, or during a step 110 where it is determined if load exceeds capacity once step 106 has determined that capacity does not exceed load. When it is determined in step 106 or 110 that load exceeds capacity, the capacity of the compressor 10 is increased in step 112. In step 112, the mechanical unloaders 12 of the compressor 10 are first operated to minimize the extent to which they reduce the capacity of the compressor 10, for example by setting them to the 100% position. Once the mechanical unloaders are set to minimize the extent to which they reduce the capacity of the compressor 10, the system again determines whether load exceeds capacity. If load continues to exceed capacity, the VFD 22 is driven to increase compressor speed, and the relationship between load and capacity is monitored as compressor speed is increased. Once load is met or exceeded by capacity, for example when the discharge temperature meets a desired set point, the system may resume the compressor speed determination of step 102 based on the current load.

Aspects:

It is to be appreciated that any one of aspects 1-7 may be combined with any of aspects 8-15 or 16-20, and that any of aspects 8-15 may be combined with any of aspects 17-20.

Aspect 1. A compressor system, comprising:
 a compressor, wherein the compressor includes one or more mechanical unloaders;
 a variable frequency drive, connected to the compressor and controlling the speed of the compressor;
 a mechanical unloader control connected to the one or more mechanical unloaders;
 at least one sensor measuring operational parameters;
 a memory configured to store a map of compressor efficiency based on compressor speed and mechanical unloading; and
 a processor that:
 receives the operational parameters;
 determines a desired compressor speed from the map of compressor efficiency,
 directs the variable frequency drive to operate the compressor at the desired compressor speed
 determines whether a compressor capacity exceeds a compressor load when operating the compressor at the desired compressor speed, and
 directs the mechanical unloader control to operate the one or more mechanical unloaders to reduce the capacity of the compressor if the compressor capacity exceeds the compressor load.

Aspect 2. The compressor system according to aspect 1, wherein the compressor is a screw compressor.

Aspect 3. The compressor system according to any of aspects 1-2, wherein the one or more mechanical unloaders comprises a slide valve.

Aspect 4. The compressor system according to any of aspects 1-3, wherein the at least one sensor measuring operational parameters comprises a first temperature sensor measuring a suction temperature and a second temperature sensor measuring a discharge temperature.

Aspect 5. The compressor system according to aspect 4, wherein the first temperature sensor is located at an inlet of the compressor.

Aspect 6. The compressor system according to any of aspects 4-5, wherein the second temperature sensor is located at an outlet of the compressor.

Aspect 7. The compressor system according to any of aspects 4-6, wherein the processor determines whether the compressor capacity exceeds compressor load by comparing the discharge temperature to a set point temperature.

Aspect 8. A method for controlling the capacity of a compressor, comprising:
 receiving operational parameters;
 based on the operational parameters, retrieving a map of compressor efficiency based on compressor speeds and mechanical unloading
 determining a desired compressor speed based on the map of compressor efficiency;
 commanding a variable frequency drive to operate the compressor at the desired compressor speed
 comparing a compressor capacity to a compressor load when the compressor is operating at the desired compressor speed; and
 increasing the extent to which one or more mechanical unloaders reduce the capacity of the compressor if the compressor capacity exceeds the compressor load.

Aspect 9. The method according to aspect 8, wherein the operational parameters comprise a suction temperature from a first temperature sensor and a discharge temperature from a second temperature sensor.

Aspect 10. The method according to aspect 9, wherein the first temperature sensor is located at an inlet of the compressor.

Aspect 11. The method according to any of aspects 9-10, wherein the second temperature sensor is located at an inlet of the compressor.

Aspect 12. The method according to any of aspects 9-11, wherein comparing a compressor capacity to a compressor load comprises comparing the discharge temperature of the compressor to a set point temperature.

Aspect 13. The method according to any of aspects 8-12, wherein increasing the extent to which one or more mechanical unloaders reduce the capacity of the compressor comprises closing a slide valve.

Aspect 14. The method according to any of aspects 8-13, further comprising minimizing the reduction of the capacity of the compressor by the one or more mechanical unloaders if comparing the compressor capacity to the compressor load indicates that the compressor capacity is less than the compressor load.

Aspect 15. The method according to aspect 14, further comprising increasing the desired compressor speed.

Aspect 16. A control system for a compressor, comprising:
 a variable frequency drive;
 at least one sensor measuring operational parameters;
 an actuator connected to a mechanical unloader of the compressor
 a memory configured to store a map of compressor efficiency based on compressor speed and mechanical unloading; and
 a processor, connected to the variable frequency drive, the first temperature sensor, the second temperature sensor, the actuator, and the memory, wherein the processor:
  receives operational parameters,
  determines a desired compressor speed based on the map of compressor efficiency,
  provides the desired compressor speed to the variable frequency drive,
  determines whether a compressor capacity exceeds a compressor load, and
  commands the actuator to reduce the capacity of the compressor using the mechanical unloader if the compressor capacity exceeds the compressor load.

Aspect 17. The control system according to aspect 16, wherein the operational parameters comprise a suction temperature measured by the first temperature sensor and a discharge temperature measured by the second temperature sensor.

Aspect 18. The control system according to aspect 17, wherein the processor:
 receives a current compressor speed from the variable frequency drive,
 determines a flow rate through the compressor, and
 based on the suction temperature and the discharge temperature is further based on the flow rate through the compressor, retrieves the map of compressor efficiency from the memory.

Aspect 19. The control system according to aspect 17, wherein determining whether a compressor capacity exceeds a compressor load comprises comparing a discharge temperature to the set point temperature.

Aspect 20. The control system according to any of aspects 16-18, wherein the mechanical unloader of the compressor is a slide valve.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A compressor system, comprising:
 a compressor, wherein the compressor includes one or more mechanical unloaders;
 a variable frequency drive, connected to the compressor and controlling the speed of the compressor;
 a mechanical unloader control connected to the one or more mechanical unloaders;
 at least one sensor measuring operational parameters;
 a memory configured to store a map of compressor efficiency based on compressor speed and mechanical unloading; and
 a processor that:
  receives the operational parameters,
  first, determines a desired compressor speed from the map of compressor efficiency based on energy consumption to operate the compressor at the desired compressor speed across mechanical unloading levels under the received operational parameters, and
  directs the variable frequency drive to operate the compressor at the desired compressor speed,
  then, when operating the compressor at the desired compressor speed, determines whether a compressor capacity exceeds a compressor load, and
  when the compressor capacity exceeds the compressor load, directs the mechanical unloader control to operate the one or more mechanical unloaders to reduce the capacity of the compressor.

2. The compressor system of claim 1, wherein the compressor is a screw compressor.

3. The compressor system of claim 1, wherein the one or more mechanical unloaders comprises a slide valve.

4. The compressor system of claim 1, wherein the at least one sensor measuring operational parameters comprises a first temperature sensor measuring a suction temperature and a second temperature sensor measuring a discharge temperature.

5. The compressor system of claim 4, wherein the first temperature sensor is located at an inlet of the compressor.

6. The compressor system of claim 4, wherein the second temperature sensor is located at an outlet of the compressor.

7. The compressor system of claim 4, wherein the processor determines whether the compressor capacity exceeds compressor load by comparing the discharge temperature to a set point temperature.

8. A control system for a compressor, comprising:
 a variable frequency drive;
 at least one sensor measuring operational parameters;
 an actuator connected to a mechanical unloader of the compressor;
 a memory configured to store a map of compressor efficiency based on compressor speed and mechanical unloading; and
 a processor, connected to the variable frequency drive, the at least one sensor, the actuator, and the memory, wherein the processor:
 receives operational parameters,
  first, determines a desired compressor speed from the map of compressor efficiency based on energy consumption to operate the compressor at the desired compressor speed across mechanical unloading levels under the received operational parameters, and
  provides the desired compressor speed to the variable frequency drive,
  then, determines whether a compressor capacity exceeds a compressor load, and
  commands the actuator to reduce the capacity of the compressor using the mechanical unloader when the compressor capacity exceeds the compressor load.

9. The control system of claim 8, wherein the at least one sensor comprises a first temperature sensor and a second temperature sensor; and the operational parameters comprise a suction temperature measured by the first temperature sensor and a discharge temperature measured by the second temperature sensor.

10. The control system of claim 9, wherein the processor:
 receives a current compressor speed from the variable frequency drive,
 determines a flow rate through the compressor, and
 wherein determining the desired compressor speed is further based on the flow rate through the compressor.

11. The control system of claim 9, wherein determining whether a compressor capacity exceeds a compressor load comprises comparing the discharge temperature to a set point temperature.

12. The control system of claim 8, wherein the mechanical unloader of the compressor is a slide valve.

13. A compressor system, comprising:
a compressor, wherein the compressor includes one or more mechanical unloaders;
a variable frequency drive, connected to the compressor and controlling the speed of the compressor;
a mechanical unloader control connected to the one or more mechanical unloaders;
at least one sensor measuring operational parameters;
a memory configured to store a map of compressor efficiency based on compressor speed and mechanical unloading; and
a processor that:
receives the operational parameters,
determines a desired compressor speed from the map of compressor efficiency based on energy consumption without respect to the mechanical unloading component of the map to operate the compressor at the desired compressor speed under the received operational parameters,
directs the variable frequency drive to operate the compressor at the desired compressor speed,
determines whether a compressor capacity exceeds a compressor load when operating the compressor at the desired compressor speed, and
directs the mechanical unloader control to operate the one or more mechanical unloaders to reduce the capacity of the compressor when the compressor capacity exceeds the compressor load.

14. A control system for a compressor, comprising:
a variable frequency drive;
at least one sensor measuring operational parameters;
an actuator connected to a mechanical unloader of the compressor;
a memory configured to store a map of compressor efficiency based on compressor speed and mechanical unloading; and
a processor, connected to the variable frequency drive, the at least one sensor, the actuator, and the memory, wherein the processor:
receives operational parameters,
determines a desired compressor speed from the map of compressor efficiency based on energy consumption without respect to the mechanical unloading component of the map to operate the compressor at the desired compressor speed under the received operational parameters,
provides the desired compressor speed to the variable frequency drive,
determines whether a compressor capacity exceeds a compressor load, and
commands the actuator to reduce the capacity of the compressor using the mechanical unloader when the compressor capacity exceeds the compressor load.

15. A method for controlling the capacity of a compressor, comprising:
receiving operational parameters;
based on the operational parameters, retrieving a map of compressor efficiency based on compressor speed and mechanical unloading;
first, determining a desired compressor speed from the map of compressor efficiency based on energy consumption to operate the compressor at the desired compressor speed across mechanical unloading levels under the received operational parameters; and
commanding a variable frequency drive to operate the compressor at the desired compressor speed;
then, when the compressor is operating at the desired compressor speed, comparing a compressor capacity to a compressor load; and
when the compressor capacity exceeds the compressor load, increasing the extent to which one or more mechanical unloaders reduce the capacity of the compressor.

16. The method of claim 15, wherein the operational parameters comprise a suction temperature from a first temperature sensor and a discharge temperature from a second temperature sensor.

17. The method of claim 16, wherein the first temperature sensor is located at an inlet of the compressor.

18. The method of claim 16, wherein the second temperature sensor is located at an outlet of the compressor.

19. The method of claim 16, wherein comparing a compressor capacity to a compressor load comprises comparing the discharge temperature of the compressor to a set point temperature.

20. The method of claim 15, wherein increasing the extent to which one or more mechanical unloaders reduce the capacity of the compressor comprises closing a slide valve.

21. The method of claim 15, further comprising minimizing the reduction of the capacity of the compressor by the one or more mechanical unloaders when comparing the compressor capacity to the compressor load indicates that the compressor capacity is less than the compressor load.

22. The method of claim 21, further comprising increasing the desired compressor speed.

23. A method for controlling the capacity of a compressor, comprising:
receiving operational parameters;
based on the operational parameters, retrieving a map of compressor efficiency based on compressor speed and mechanical unloading;
determining a desired compressor speed from the map of compressor efficiency based on energy consumption without respect to the mechanical unloading component of the map to operate the compressor at the desired compressor speed under the received operational parameters;
commanding a variable frequency drive to operate the compressor at the desired compressor speed;
comparing a compressor capacity to a compressor load when the compressor is operating at the desired compressor speed; and
increasing the extent to which one or more mechanical unloaders reduce the capacity of the compressor when the compressor capacity exceeds the compressor load.

* * * * *